(12) United States Patent
Namazue

(10) Patent No.: US 7,606,478 B2
(45) Date of Patent: Oct. 20, 2009

(54) LENS BARREL SUITABLE TO BE HOUSED

(75) Inventor: Eriko Namazue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 11/563,872

(22) Filed: Nov. 28, 2006

(65) Prior Publication Data

US 2007/0127906 A1   Jun. 7, 2007

(30) Foreign Application Priority Data

Dec. 1, 2005   (JP) ............................. 2005-348025

(51) Int. Cl.
 *G03B 17/00* (2006.01)
(52) U.S. Cl. ........................................ 396/73; 359/675
(58) Field of Classification Search .................. 396/73, 396/75, 79, 85; 359/678, 696, 699, 703, 359/675; 348/345
See application file for complete search history.

(56) References Cited

U.S. PATENT DOCUMENTS 4,887,107 A * 12/1989 Nakamura et al. ............ 396/75
6,055,378 A * 4/2000 Oono et al. .................... 396/82
2006/0056078 A1 * 3/2006 Nomura et al. ............. 359/811
2006/0176373 A1 * 8/2006 Ito et al. ................. 348/208.12

* cited by examiner

*Primary Examiner*—Melissa J Koval
*Assistant Examiner*—Autumn Parker
(74) *Attorney, Agent, or Firm*—Cowan, Liebowitz & Latman, P.C.

(57) ABSTRACT

A retractable lens barrel achieving thinning thereof in both directions parallel and perpendicular to a photographic optical axis. The lens barrel has a first lens and a second lens disposed in an inside thereof, and has a structure in which an optical axis of the second lens is aligned with an optical axis of the first lens when photographing, and the first lens is moved to a housed position and the second lens is moved in a retreating direction from the optical axis of the first lens when the first and second lenses are retracted. The lens barrel also has a holding member for holding the second lens and a rotation unit for rotating the holding member of the second lens, the holding member being rotated about a rotation shaft different from the optical axis of the first lens and perpendicular to the optical axes of the first and second lenses.

8 Claims, 10 Drawing Sheets

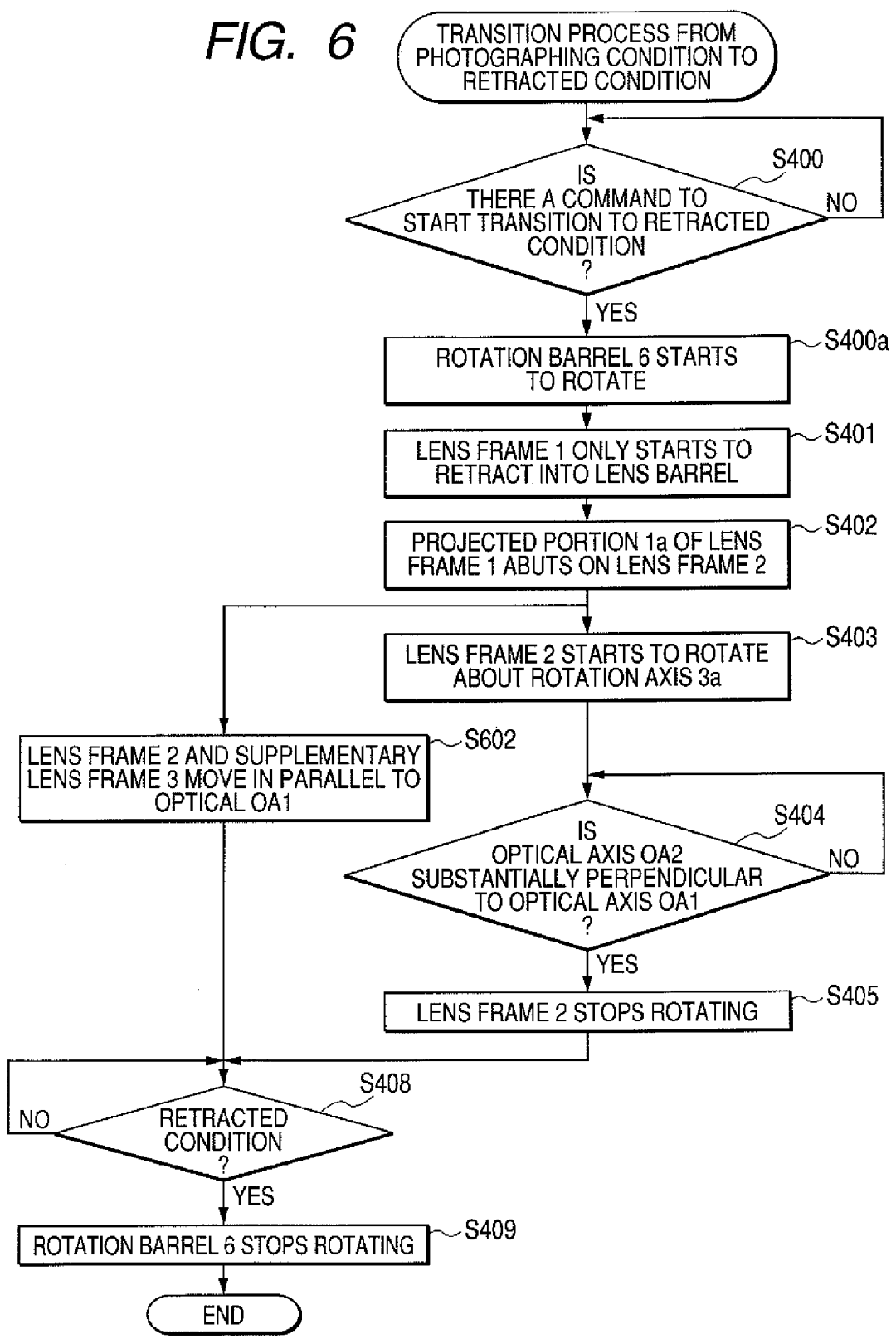

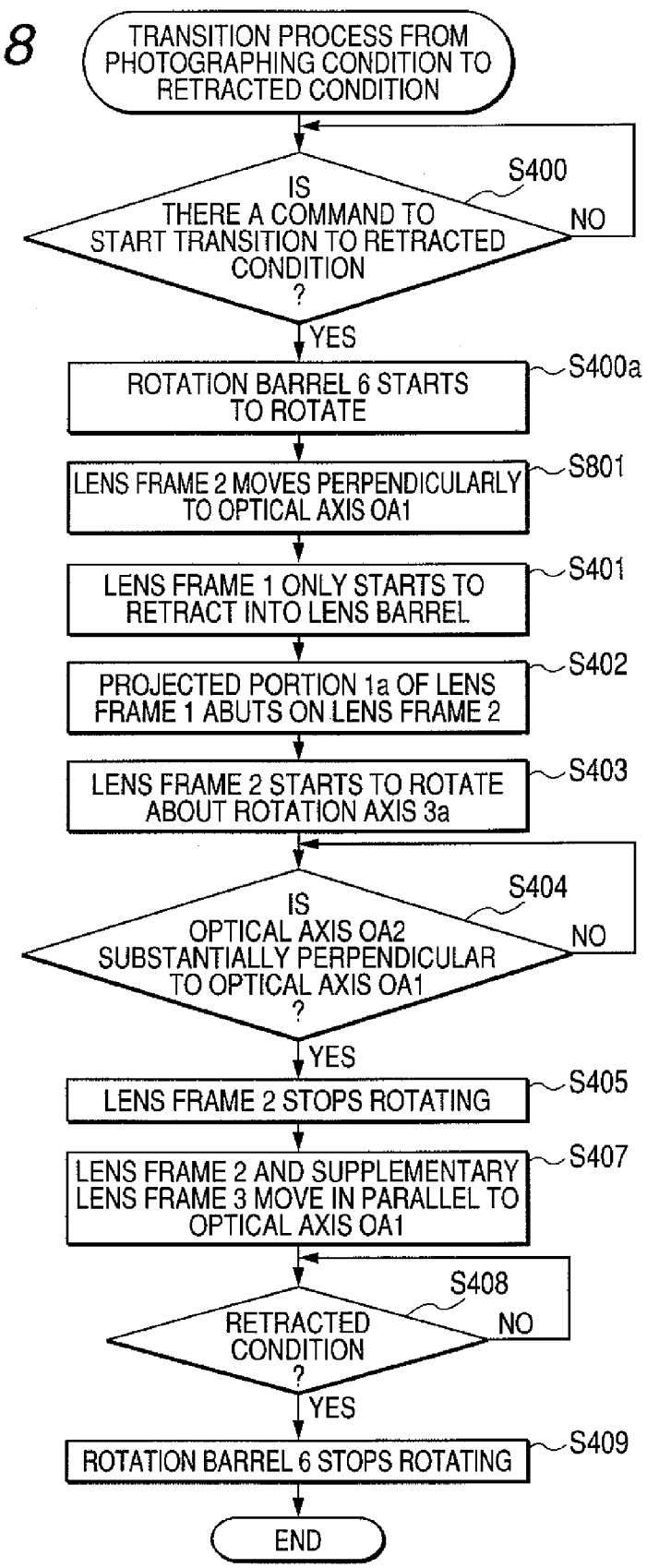

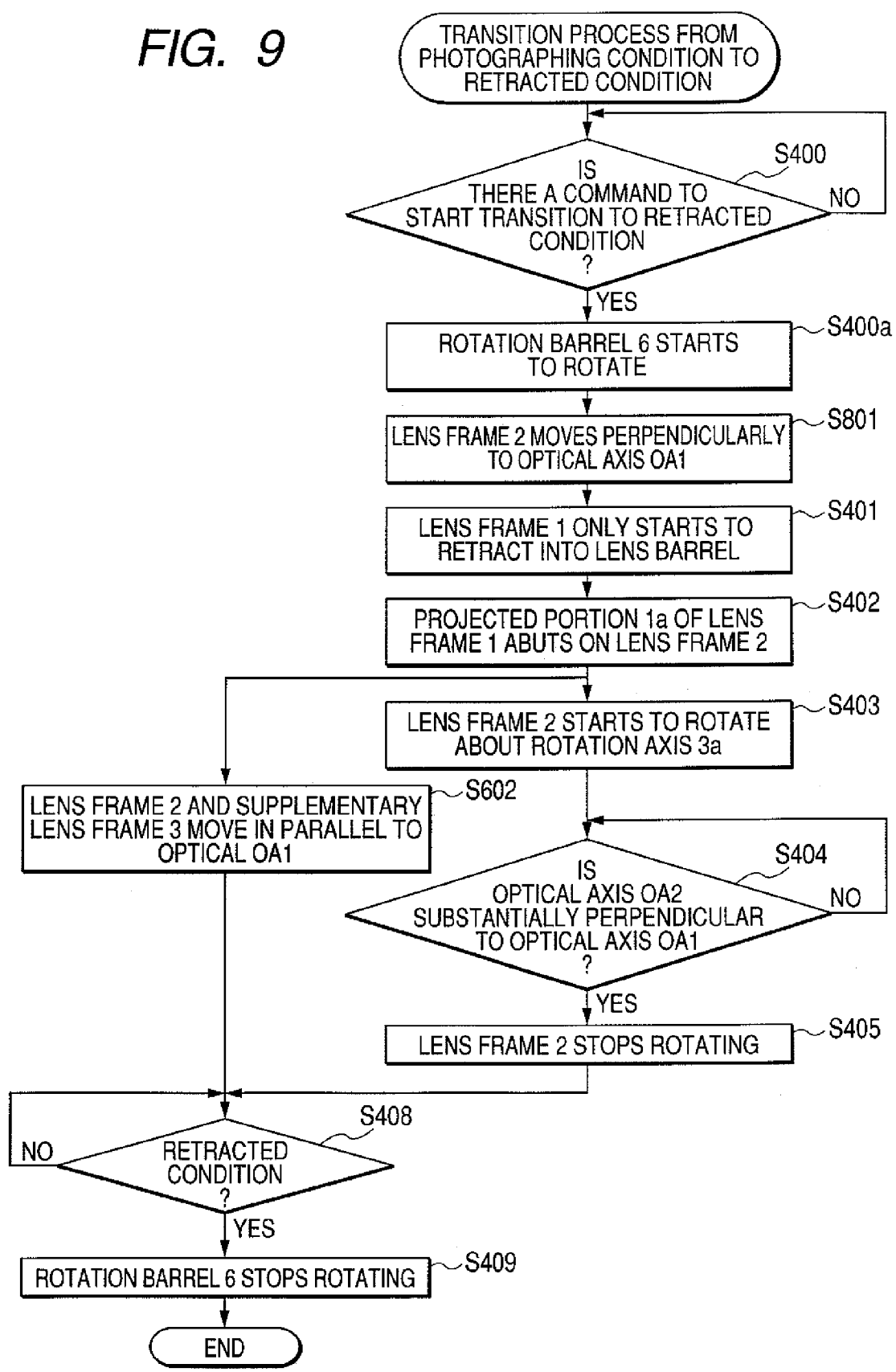

LENS BARREL SUITABLE TO BE HOUSED

BACKGROUND OF THE INVENTION

1. Field of the Invention

The present invention relates to a retractable lens barrel, and more particularly, to a retractable lens barrel for use in a video camera, a still camera, or other image pickup apparatuses.

2. Description of the Related Art

In recent years, downsizing and thinning of a video camera and a still camera have been strongly required. In order to realize the downsizing and the thinning, it has been common to cause photographic lenses to retract to be housed in a thin body. However, recently, in order to realize further thinning, there has been proposed a first conventional art in which, when the photographic lenses are retracted, a certain unit of the photographic lenses is retreated so as to be deviated from an optical axis.

For example, the first conventional art of a still camera having a lens unit composed of three lenses (optical elements) L1, L2 and L3 as shown in FIGS. 10A and 10B is disclosed. In the still camera, all the lenses are located on the same photographic optical axis Z1 as shown in FIG. 10A in a photographing condition, and when the lenses are retracted, the lens L2 is retreated to a position different from that on the optical axis Z1 as shown in FIG. 10B (for example, refer to Japanese Patent Application Laid-Open No. 2003-315861).

Further, a second conventional art in which a converter lens is retreated out of a photographic optical axis while rotating has also been disclosed (for example, refer to Japanese Patent Application Laid-Open No. S63-135908).

However, the still camera of the first conventional art is constructed so that an optical axis Z1' of the lens L2 after retreat and the photographic optical axis Z1 are in parallel to each other.

Therefore, when a diameter of the lens L2 is larger than a thickness thereof, there is a problem in that a size of a lens barrel of the lens L2 in a direction perpendicular to the optical axis Z1, that is, a radial size of the lens barrel of the lens L2 is increased.

Further, in the second conventional art, a rotation axis of the converter lens does not move though is perpendicular to the photographic optical axis, and accordingly, there is a problem in that a thickness of a lens barrel thereof in a direction of the photographic optical axis is increased.

SUMMARY OF THE INVENTION

It is an object of the present invention to provide a retractable lens barrel capable of achieving thinning thereof in both directions parallel and perpendicular to a photographic optical axis.

According to the present invention, there is provided a lens barrel, which is provided with a first lens and a second lens disposed in an inside thereof, and has a structure in which an optical axis of the second lens is matched with an optical axis of the first lens when photographing is performed, and the first lens is moved to a housed position thereof and the second lens is moved in a retreating direction thereof from the optical axis when the first lens and the second lens are retracted, the lens barrel including: a holding member for holding the second lens; and a rotation unit for rotating the holding member of the second lens. In the lens barrel, the holding member of the second lens is rotated about a rotation axis different from the optical axis and perpendicular to the optical axis and the optical axis of the second lens.

Further features of the present invention will become apparent from the following description of exemplary embodiments with reference to the attached drawings.

BRIEF DESCRIPTION OF THE DRAWINGS

FIG. 6 is a flowchart showing a procedure of a modification example of the transition process of FIG. 4.

FIG. 8 is a flowchart showing a procedure of the transition process from the photographing condition to the retracted condition, which is executed in the retractable lens barrel of FIGS. 7A, 7B, 7C, 7D, 7E and 7F.

FIG. 9 is a flowchart showing a procedure of a modification example of the transition process of FIGS. 7A, 7B, 7C, 7D, 7E and 7F.

DESCRIPTION OF THE EMBODIMENTS

A description will be made below of an embodiment of the present invention with reference to the drawings.

A detailed description will be made of an embodiment mode of the present invention with reference to the drawings.

Figure 1:
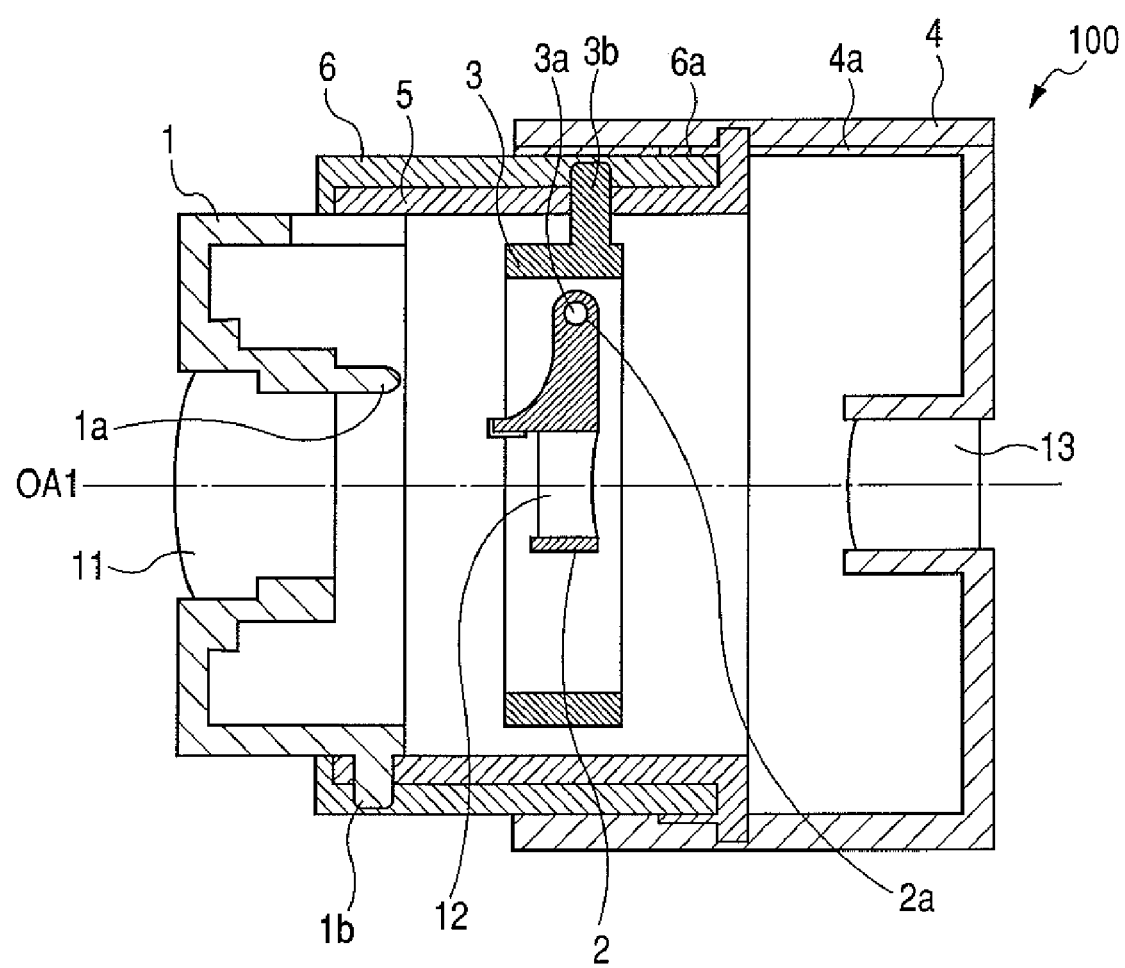
FIG. 1 is a view schematically showing a construction and arrangement of a retractable lens barrel according to an embodiment of the present invention in a photographing condition.

FIG. 1 is a view schematically showing a construction and arrangement of a retractable lens barrel according to an embodiment in a photographing condition.

In FIG. 1, a retractable lens barrel 100 includes: a lens frame 1 which holds a lens 11; a lens frame 2 which holds a lens 12; and a supplementary lens frame 3 having a rotation shaft 3a in a direction perpendicular to an optical axis OA1 of a photographic optical system. Further, the retractable lens barrel 100 includes a fixed barrel 4 which is fixed and attached onto a camera body (not shown) by screws or the like and holds a third lens 13.

The lens frame 1 has a projected portion 1a abutting on the lens frame 2 while the lens 11 is being retracted, and in addition, the lens frame 2 has a circular hole 2a engaged with the rotation shaft 3a of the supplementary lens frame 3. Thus, an optical axis of the lens 2 can be surely rotated in association with the retraction of the lens 11.

Further, the retractable lens barrel 100 includes: a linear-moving barrel 5 not-rotatably held by the fixed barrel 4; and a rotation barrel 6 of which inner diameter is rotatably engaged with and held by an outer diameter of the linear-moving barrel 5.

A helicoid screw 4a is formed on an inner circumference of the fixed barrel 4, and a helicoid screw 6a is formed on an outer circumference of the rotation barrel 6. The rotation barrel 6 is screwed into the fixed barrel 4 by using the helicoid screws 4a and 6a.

Further, on the rotation barrel 6, a gear interlocking with a publicly known lens barrel drive system (not shown) is formed. The rotation barrel 6 is rotated by the lens barrel drive system, and advances/retreats along the helicoid screw 4a of the fixed barrel 4 in a direction parallel to a direction of the optical axis OA1. Specifically, when a motor of the above-mentioned lens barrel drive system is driven, the gear meshing with the motor is first driven. Further, the rotation barrel 6 meshing with the gear concerned starts to rotate when the gear is driven as described above.

Further, each of the lens frame 1 and the supplementary lens frame 3 has a projected portion (not shown), and the respective projected portions are fitted into cam grooves formed in the rotation barrel 6 and the linear-moving barrel 5. Thus, when the rotation barrel 6 abuts on the projected portions of the lens frame 1 and the supplementary lens frame 3, the lens frame 1 and the supplementary lens frame 3 move along the cam grooves of the rotation barrel 6 and the linear-moving barrel 5. In terms of positions, the projected portions of the lens frame 1 and the supplementary lens frame 3 and the cam grooves of the rotation barrel 6 and the linear-moving barrel 5 are formed in accordance with operation timing of the lens frame 1 and the supplementary lens frame 3 in processes of FIGS. 4, 6, 8 and 9, which are to be described later.

A cam pin 1b is provided on the lens frame 1, and a cam pin 3b is provided on the supplementary lens frame 3. The cam pins 1b and 3b are inserted into the cam grooves of the linear-moving barrel 5 and the rotation barrel 6. Thus, when the rotation barrel 6 rotates, the cam pins 1b and 3b of the lens frame 1 and the supplementary lens frame 3 rotationally move along the cam grooves of the rotation barrel 6 and the linear-moving barrel 5, the lens frame 1 and the supplementary lens frame 3 advance and retreat in the optical axis direction, and zooming of the optical system is performed.

Figure 2:
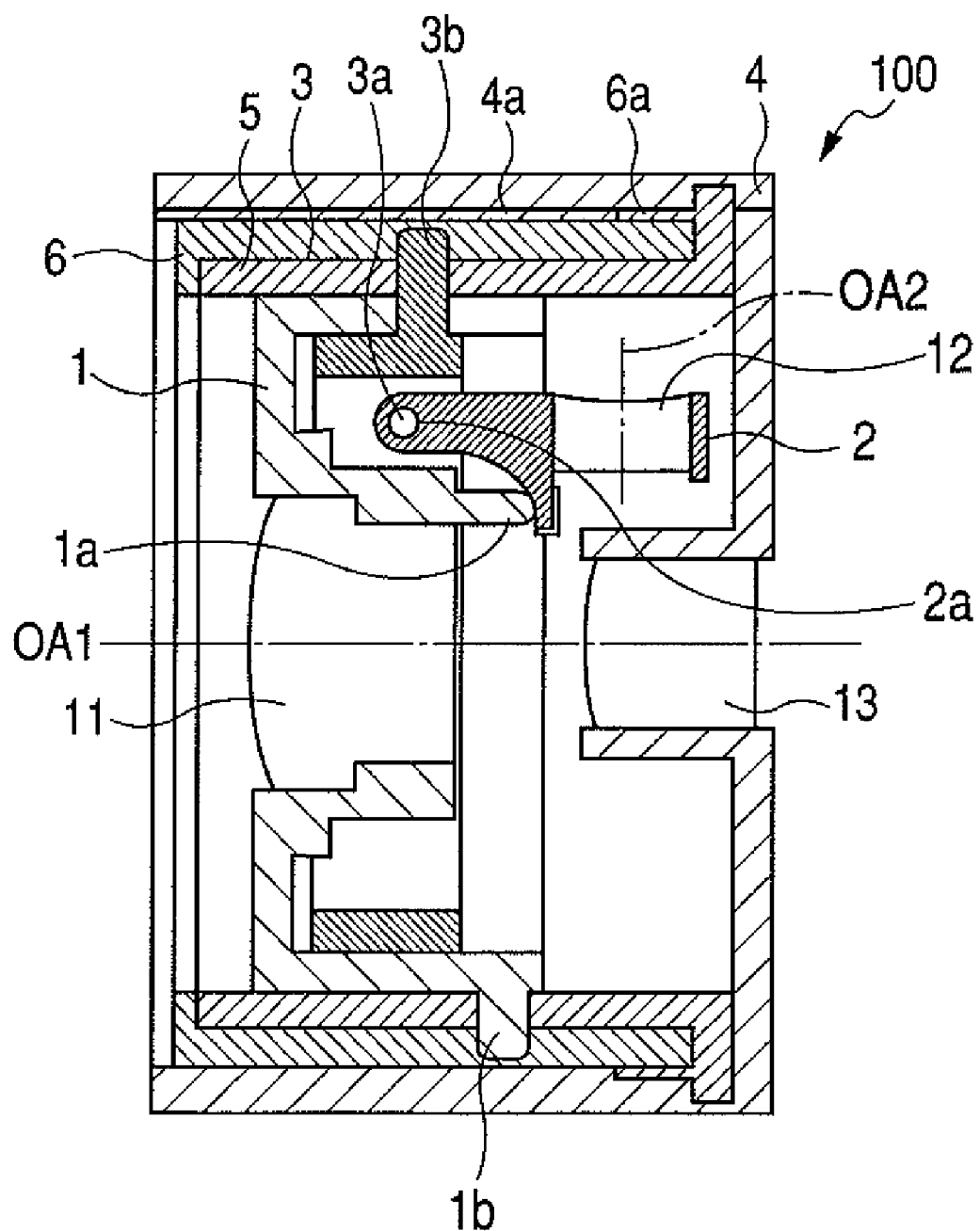
FIG. 2 is a view schematically showing a construction and arrangement of the retractable lens barrel of FIG. 1 in a retracted condition.

In the photographing condition, as shown in FIG. 1, all the lenses 11, 12 and 13 in the retractable lens barrel 100 are located on the same optical axis OA1. Meanwhile, the retractable lens barrel 100 is constructed so that, in a retracted condition, only the lens 12 among all the above-mentioned lenses 11, 12 and 13 can retreat to a position different from that on the optical axis OA1 as shown in FIG. 2.

Note that, though each of the lenses 11, 12 and 13 has been described to be composed of a single lens for a purpose of simplifying the explanation, each of those may be an optical system composed of a plurality of lenses.

Figure 4:
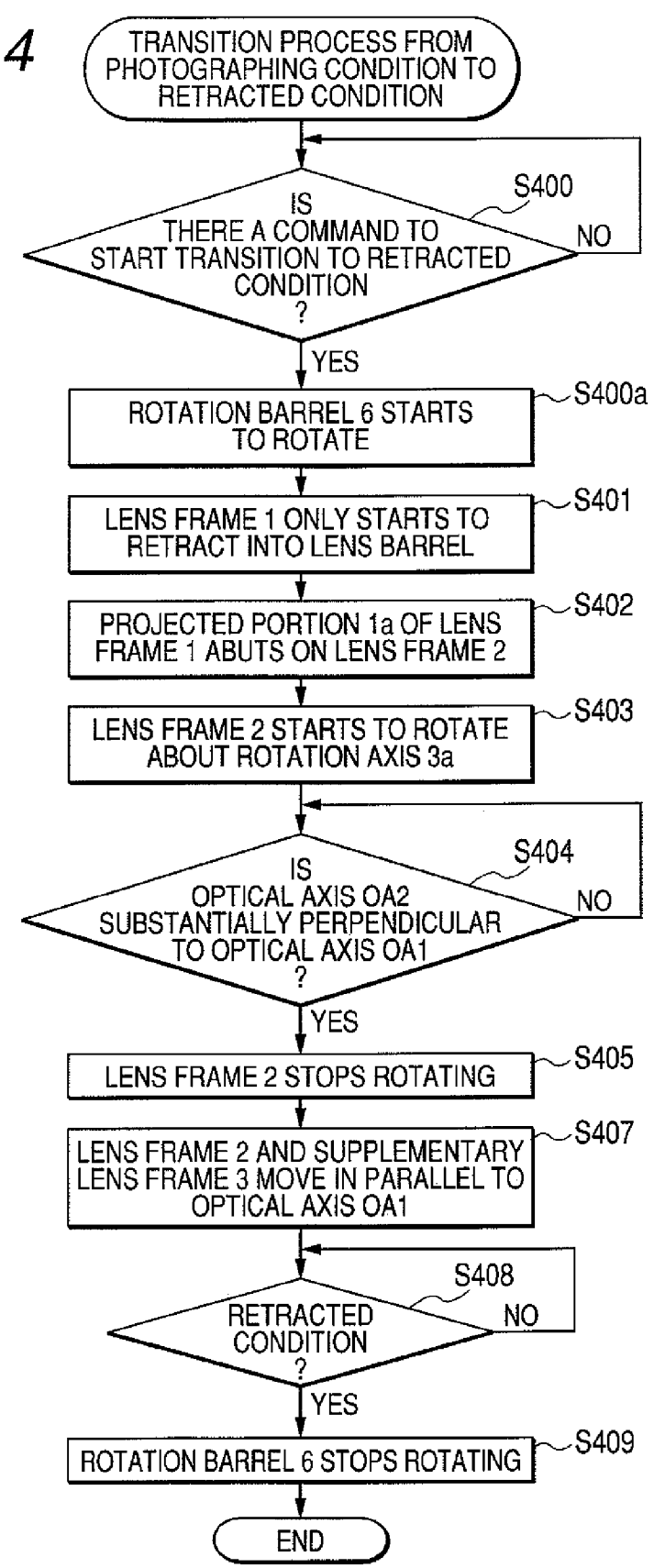
FIG. 4 is a flowchart showing a procedure of a transition process from the photographing condition to the retracted condition, which is executed by the retractable lens barrel.

FIG. 4 is a flowchart showing a procedure of a transition process from the photographing condition to the retracted condition, which is executed by the retractable lens barrel 100.

Figure 3A:
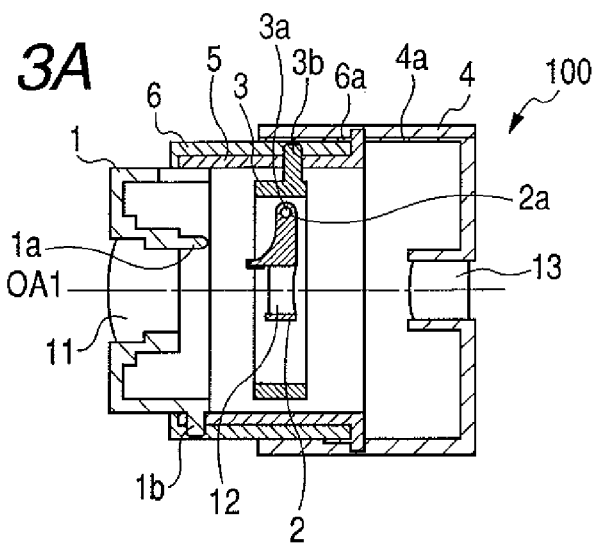
FIG. 3A is a view showing transition of the retractable lens barrel of FIG. 1 from the photographing condition to the retracted condition in a step-by-step manner, in which the photographing condition is shown.

In FIG. 4, first, it is determined whether or not there is a command to start the transition to the retracted condition in the photographing condition (Step S400). When there is the command to start the transition as a result of the determination (YES in Step S400), the publicly known lens barrel drive system (not shown) is activated, and the rotation barrel 6 rotates through the gear interlocking with the lens barrel drive system (Step S400a). After that, in association with the rotation of the rotation barrel 6, first, only the lens frame 1 starts to retract into the retractable lens barrel 100 from the photographing condition (FIG. 3A), and moves in the direction parallel to the direction of the optical axis OA1 (Step S401). Note that, in terms of the positions, the projected portion of the supplementary lens frame 3 and the cam grooves of the linear-moving barrel 5 and the fixed barrel 6 are formed so that the supplementary lens frame 3 does not abut on the fixed barrel 6 immediately after the rotation of the rotation barrel 6. Therefore, at the timing when the lens frame 1 starts to retract in Step S401, the supplementary lens frame 3 does not move in parallel to the optical axis OA1 (does not retract/project).

Figure 3B:
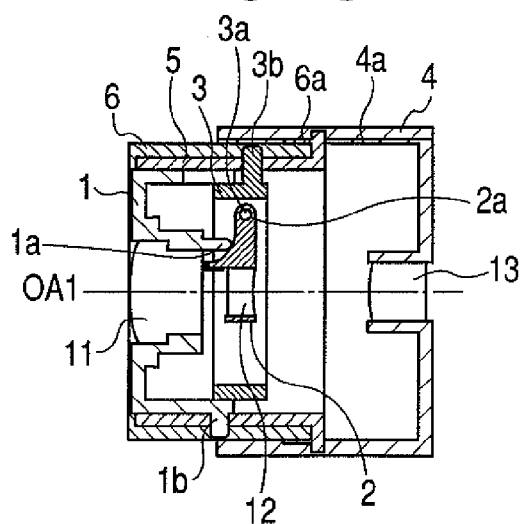
FIG. 3B is a view showing the transition of the retractable lens barrel of FIG. 1 from the photographing condition to the retracted condition in the step-by-step manner, in which a condition immediately after a projected portion abuts on a lens frame is shown.
Figure 3C:
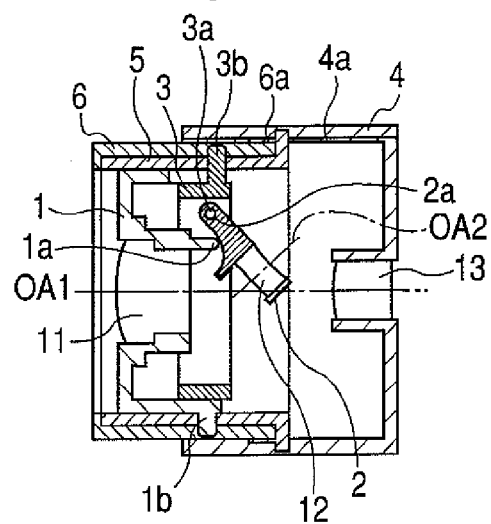
FIG. 3C is a view showing the transition of the retractable lens barrel of FIG. 1 from the photographing condition to the retracted condition in the step-by-step manner, in which a condition where the lens frame rotates is shown.

Subsequently, when the projected portion 1a of the lens frame 1 abuts on the lens frame 2 (Step S402, FIG. 3B), the lens frame 2 starts to rotate about the rotation shaft 3a by a pressing force applied from the lens frame 1 (Step S403, FIG. 3C). Thus, the lens frame 2 retreats out of the optical axis OA1. Note that, in terms of the positions, the projected portion of the supplementary lens frame 3 and the cam grooves of the linear-moving barrel 5 and the fixed barrel 6 are formed so that the supplementary lens frame 3 does not abut on the fixed barrel 6 even at the timing of Step S402. Therefore, at the timing when the lens frame 2 starts to rotate in Step S401, the supplementary lens frame 3 does not move.

Figure 3D:
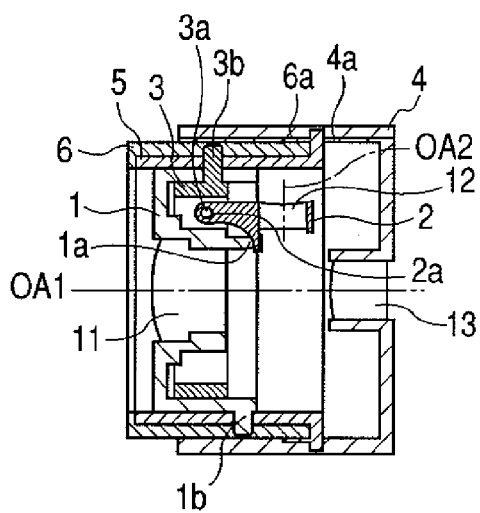
FIG. 3D is a view showing the transition of the retractable lens barrel of FIG. 1 from the photographing condition to the retracted condition in the step-by-step manner, in which a condition where the lens frame finishes rotating is shown.

When an optical axis OA2 of the lens 12 becomes substantially perpendicular to the optical axis OA1 by the above-mentioned rotation of the lens frame 2 (YES in Step S404, FIG. 3D), the lens frame 2 finishes rotating (Step S405). Thus, the lens frame 2 completely retreats out of the optical axis OA1.

At the point of time when the lens frame 2 finishes rotating, the projected portion of the supplementary lens frame 3 abuts on the fixed barrel 6. Thus, the supplementary lens frame 3 starts to move in the direction parallel to the optical axis OA1 along the cam grooves of the linear-moving barrel 5 and the fixed barrel 6 by a pressing force applied from the fixed barrel 6. When the supplementary lens frame 3 starts to move, the lens frame 2 also starts to move in parallel to the optical axis OA1 in a similar way (Step S407).

Figure 3E:
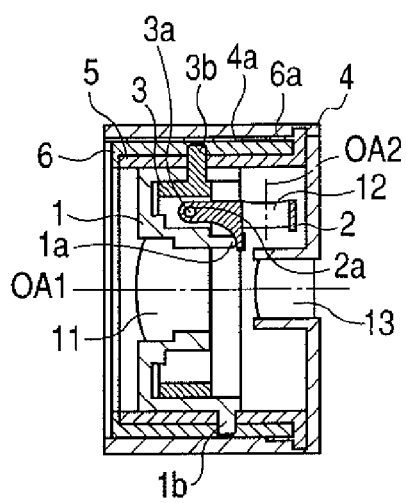
FIG. 3E is a view showing the transition of the retractable lens barrel of FIG. 1 from the photographing condition to the retracted condition in the step-by-step manner, in which the retracted condition is shown.

Subsequently, when the condition is shifted to the retracted condition (YES in Step S408, FIG. 3E), the rotation barrel 6 stops rotating (Step S409), and this process is ended.

According to the process of FIG. 4, the projected portion 1a is made to abut on the lens frame 2 when the lens 11 is retreated, and the lens frame 2 is thereby rotated and retreated out of the optical axis OA1. Thus, the lens frame 1 can be housed in a space of the lens frame 2, and a thickness of the retractable lens barrel 100 in the direction parallel to the optical axis OA1 can be reduced.

Further, the lens frame 1 is made to abut on the supplementary lens frame 3 after the lens 12 is retreated out of the optical axis OA1, and the supplementary lens frame 3 and the lens frame 2 are thereby moved in the direction parallel to the optical axis OA1. Thus, a thickness of the retractable lens barrel 100 in the direction perpendicular to the optical axis OA1 can also be reduced.

FIG. 6 is a flowchart showing a procedure of a modification example of the transition process of FIG. 4.

A process of FIG. 6 is basically the same as the process of FIG. 4. The same steps as the steps of FIG. 4 are denoted by the same reference symbols, a duplicate description will be omitted and portions different from those of the process of FIG. 4 will only be described below.

Figure 5A:
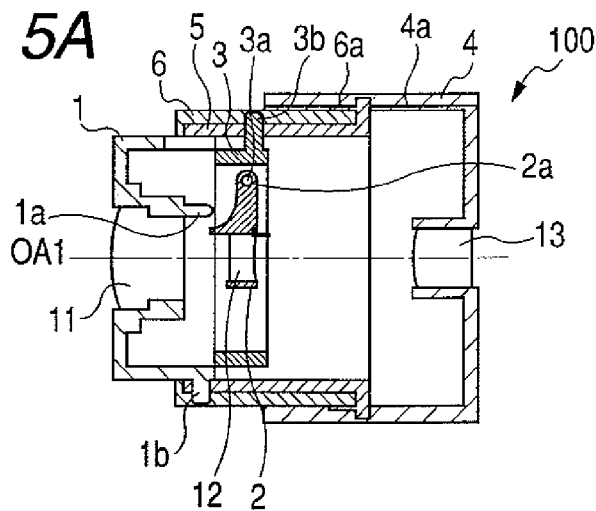
FIGS. 5A, 5B, 5C, 5D and 5E are views each showing a modification example of the transition of the retractable lens barrel from the photographing condition to the retracted condition in a step-by-step manner.

In FIG. 6, first, the publicly known lens barrel drive system (not shown) is activated by the command to start the transition to the retracted condition, and the rotation barrel 6 starts to rotate through the gear interlocking with the lens barrel drive system (Steps S400 and S400*a*). After that, in association with the rotation of the rotation barrel 6, only the lens frame 1 starts to retract into the retractable lens barrel 100 from the photographing condition (FIG. 5A) (Step S401).

Figure 5B:
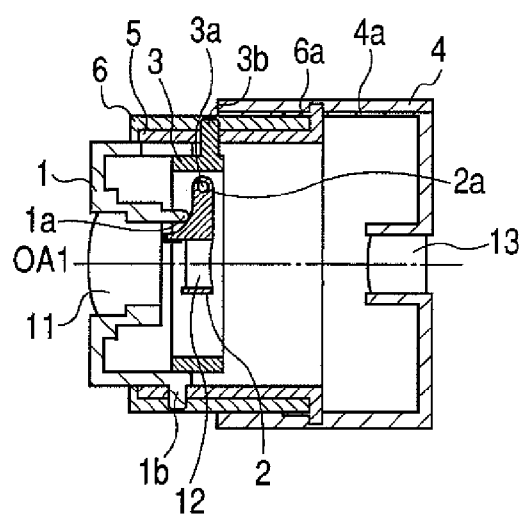
Figure 5C:
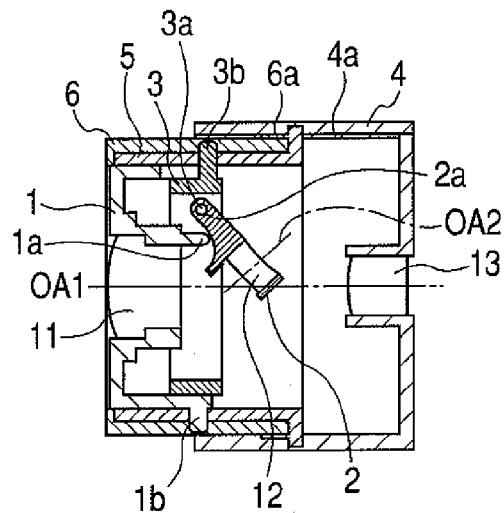

Subsequently, when the projected portion 1*a* of the lens frame 1 abuts on the lens frame 2 (Step S402, FIG. 5B), the lens frame 2 starts to rotate about the rotation shaft 3*a* (Step S403, FIG. 5D). At this time, the projected portion of the supplementary lens frame 3 abuts on the fixed barrel 6. Thus, the supplementary lens frame 3 starts to move in the direction parallel to the optical axis OA1 along the cam grooves of the linear-moving barrel 5 and the fixed barrel 6 by the pressing force applied from the fixed barrel 6. When the supplementary lens frame 3 starts to move, the lens frame 2 also starts to move in parallel to the optical axis OA1 in a similar way (Step S602).

Figure 5D:
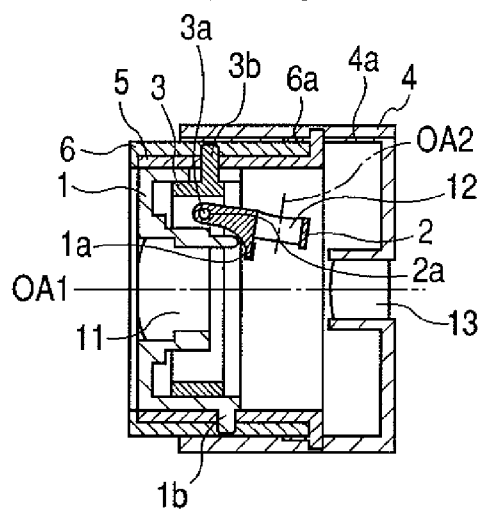
Figure 5E:
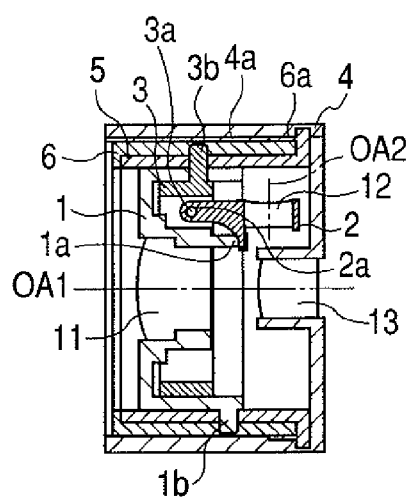

When the optical axis OA2 of the lens 12 becomes substantially perpendicular to the optical axis OA1 by the above-mentioned rotation of the lens frame 2, the lens frame 2 finishes rotating (Steps S404 and S405, FIG. 5D). After that, when the condition is shifted to the retracted condition (Step S408, FIG. 5E) by the movements of the lens frame 2 and the supplementary lens frame 3 in parallel to the optical axis OA1, which are subsequently performed, the rotation barrel 6 stops rotating (Step S409), and this process is ended.

According to this modification example, at the same time when the lens frame 2 is rotated to retreat the lens 12 out of the optical axis OA1 in the case of retreating the lens 11, the lens frame 2 and the supplementary lens frame 3 are moved in parallel to the optical axis OA1. Accordingly, the lens 11 can be retracted more quickly.

FIGS. 7A, 7B, 7C, 7D, 7E and 7F are views each showing the transition of the modification example of the retractable lens barrel 100 of FIG. 1 from the photographing condition to the retracted condition.

A retractable lens barrel 100*a* of FIGS. 7A, 7B, 7C, 7D, 7E and 7F is basically the same in construction as the above-mentioned retractable lens barrel 100. The same constituents as those of the retractable lens barrel 100 are denoted by the same reference symbols, a duplicate description will be omitted, and a description will be made below of different constituents.

The retractable lens barrel 100*a* is different from the retractable lens barrel 100 only in that the lens frame 2 has a long hole 72*a* in place of the circular hole 2*a* (FIG. 1) engaged with the rotation shaft 3*a* of the supplementary lens frame 3.

FIG. 8 is a flowchart showing a procedure of a transition process from the photographing condition to the retracted condition, which is executed by the retractable lens barrel 100*a* of FIGS. 7A, 7B, 7C, 7D, 7E and 7F.

The process of FIG. 8 is basically the same as the process of FIG. 4. The same steps as the steps of FIG. 4 are denoted by the same reference numerals, a duplicate description will be omitted and portions different from those of the process of FIG. 4 will only be described below.

In FIG. 8, first, the publicly known lens barrel drive system (not shown) is activated by the command to start the transition to the retracted condition, and the rotation barrel 6 rotates through the gear interlocking with the lens barrel drive system (Steps S400 and S400*a*). After that, in association with the activation of the lens barrel drive system, the lens frame 2 moves in the direction perpendicular to the optical axis OA1 (Step S801, FIG. 7B). Thus, an optical axis OA72 of the lens 12 becomes an axis which is not coaxial with and is positionally different from the optical axis OA1 immediately after the command to start the transition while being parallel thereto.

Figure 7A:
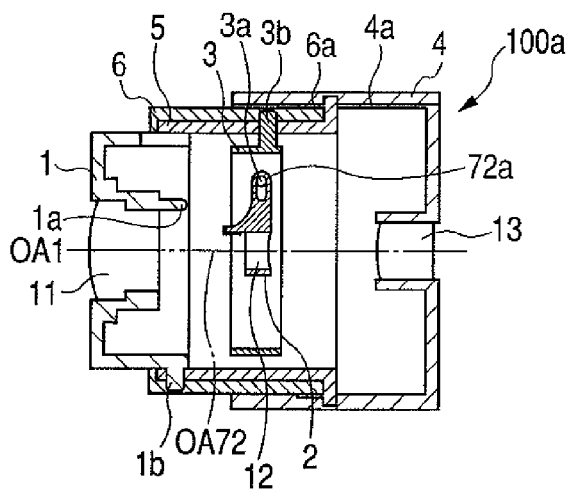
FIGS. 7A, 7B, 7C, 7D, 7E and 7F are views each showing transition of a modification example of the retractable lens barrel from a photographing condition to a retracted condition in a step-by-step manner.
Figure 7B:
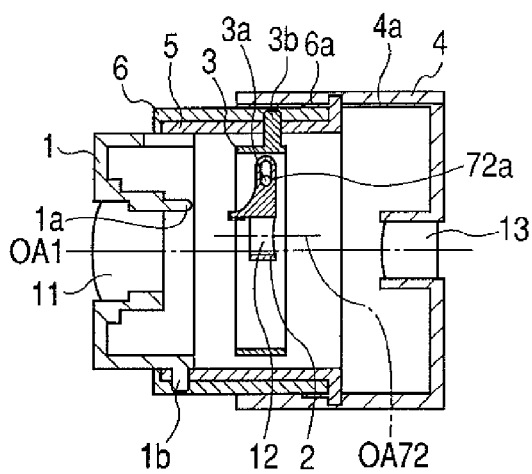
Figure 7C:
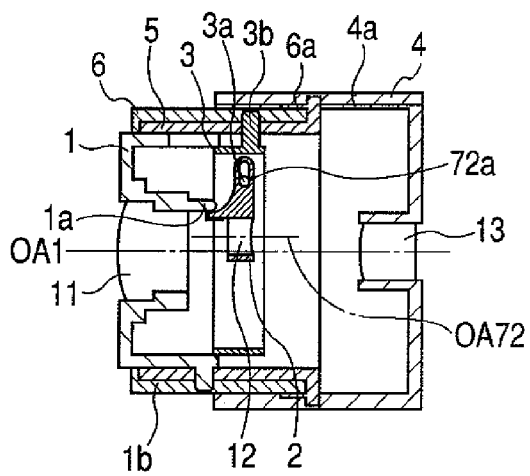
Figure 7D:
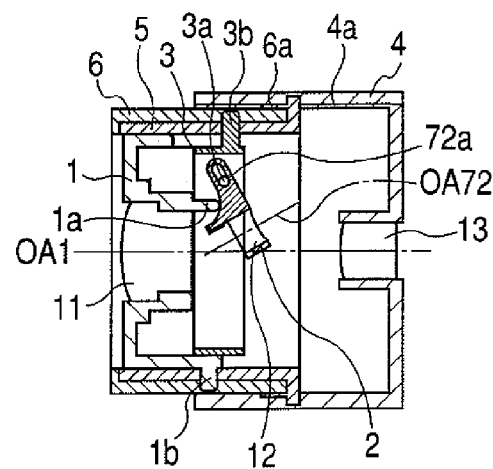
Figure 7E:
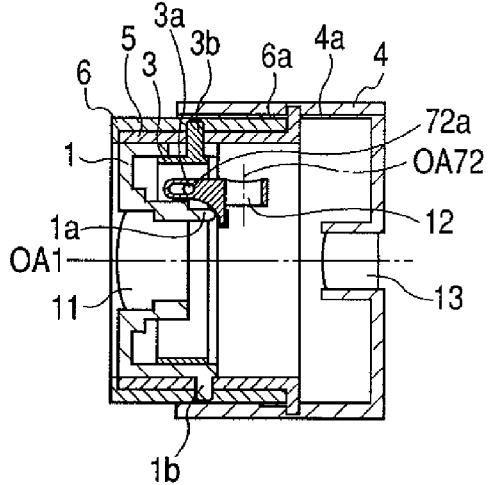
Figure 7F:
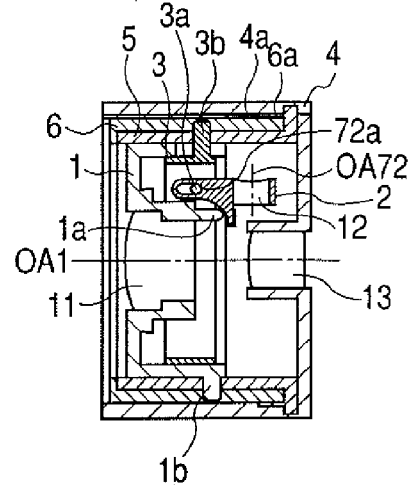
Figure 10B:
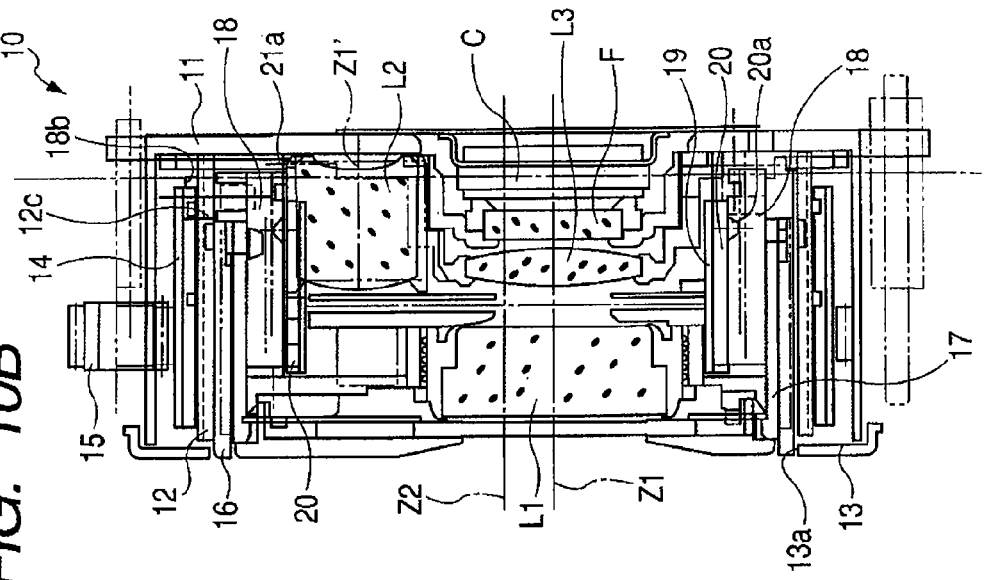
FIG. 10B is a view schematically showing the construction of the conventional retractable lens barrel, in which the retracted condition is shown.
Figure 10A:
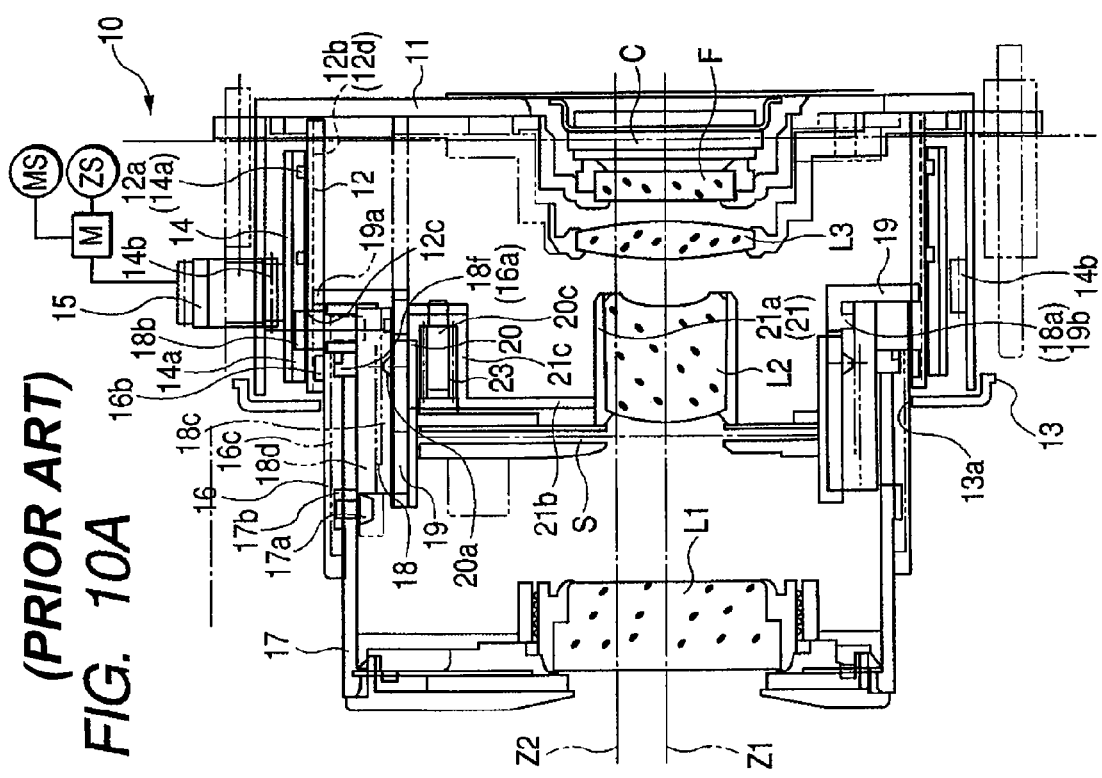
FIG. 10A is a view schematically showing a construction of a conventional retractable lens barrel, in which the photographing condition is shown.

Subsequently, first, only the lens frame 1 starts to retract into the retractable lens barrel 100 (Step S401, FIG. 7C). After that, the projected portion 1*a* of the lens frame 1 abuts on the lens frame 2, and the lens frame 2 thereby starts to rotate (Steps S402 and S403, FIG. 7D).

Next, at the point of time when the optical axis OA2 of the lens 12 becomes substantially perpendicular to the optical axis OA1, and the lens frame 2 finishes rotating (Steps S405 and S406, FIG. 7E), the lens frame 2 and the supplementary lens frame 3 start to move in parallel to the optical axis OA1 (Step S407). After that, when the condition is shifted to the retracted condition (Step S408, FIG. 7F), the rotation barrel 6 stops rotating (Step S409), and this process is ended.

According to the process of FIG. 8, the lens frame 2 first moves perpendicularly to the optical axis OA1 (Step S801), and accordingly, a rotation radius of the lens frame 2 can be reduced, leading to space saving.

Note that timing when the rotation barrel 6 starts to move in parallel to the optical axis OA1 in this process may be not the point of time when the lens frame 2 finishes rotating but the point of time when the projected portion 1*a* of the lens frame 1 abuts on the lens frame 2.

In this case, as shown in FIG. 9, between the process of Step S400*a* and the process of Step S401 in the flowchart of FIG. 6, a process of Step S801 of moving the lens frame 2 perpendicularly to the optical axis OA1 is performed.

Thus, the lens frame 2 first moves perpendicularly to the optical axis OA1, and after that, the lens frame 2 is rotated to retreat the lens 12 out of the optical axis OA1 in the case of retreating the lens 11. Simultaneously, the lens frame 2 and the supplementary lens frame 3 are moved in parallel to the optical axis OA1. Thus, the lens 11 can be retracted more quickly.

According to the present invention, by the rotation shaft arranged out of the photographic optical axis and perpendicular to the photographic optical axis and to the optical axis of the second lens disposed in the inside of the retractable lens barrel, the optical axis of the second lens is rotated so that the second lens is moved in parallel to the photographic optical axis. Accordingly, the reduction in thickness of the retractable lens barrel in both of the directions parallel and perpendicular to the photographic optical axis can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-348025, filed on Dec. 1, 2005, which is hereby incorporated by reference herein in its entirety.

What is claimed is:

1. A lens barrel, which has a first lens and a second lens disposed in an inside thereof, and has a structure in which an optical axis of the second lens is aligned with an optical axis of the first lens when photographing is performed, and the first lens is moved to a housed state thereof and the second lens is moved in a retreating direction thereof from the optical axis of the first lens when the first lens and the second lens are retracted, the lens barrel comprising:
a holding member which holds the second lens; and
a rotation unit which rotates the holding member for the second lens,
wherein in the housed state, the optical axes of the first lens and the second lens are in condition to intersect each other by the rotation unit; and
wherein the first lens frame has a projected portion which abuts on a lens frame of the second lens when the first lens moves to the housed position.

2. A lens barrel according to claim 1, further comprising: a parallel movement unit for moving the second lens in parallel to the optical axis of the first lens.

3. A lens barrel according to claim 2, wherein, when the first lens is retracted, the rotation unit rotates the second lens until the optical axis of the second lens becomes substantially perpendicular to the optical axis of the first lens, and subsequently, and then the parallel movement unit moves the second lens to an opposite side with respect to the first lens.

4. A lens barrel according to claim 2, wherein, when the first lens is retracted, the rotation unit rotates the second lens until the optical axis of the second lens becomes substantially perpendicular to the optical axis of the first lens while the parallel movement unit moves the second lens to an opposite side with respect to the first lens.

5. A lens barrel according to claim 1, wherein a lens frame of the second lens includes a circular hole engaging with the rotation shaft.

6. A lens barrel according to claim 1, further comprising: an inter-axis distance control unit for allowing the optical axis of the second lens and the rotation shaft to approach each other before the rotation unit rotates the second lens when the first lens moves to the housed position.

7. A lens barrel according to claim 6, wherein a lens frame of the second lens includes a long hole engaging with the rotation shaft.

8. A lens barrel according to claim 1, wherein the rotation shaft is fixed to a supplementary lens frame moving in parallel to the optical axis of the first lens.

* * * * *